UNITED STATES PATENT OFFICE.

MARION W. PITNER, OF CHICAGO, ILLINOIS.

PIPE-END CLOSURE.

959,385.  Specification of Letters Patent.  Patented May 24, 1910.

Application filed October 21, 1908, Serial No. 458,816. Renewed April 6, 1910. Serial No. 553,841.

*To all whom it may concern:*

Be it known that I, MARION W. PITNER, a citizen of the United States, residing in Chicago, Cook county, Illinois, have invented certain new and useful Improvements in Pipe-End Closures, of which the following is a full and correct specification, reference being had to the hereto accompanying drawing, forming a part hereof, and in which—

Figure 1 shows the device in sectional elevation taken on the short cutting planes $x$ $x$ and cutting plane $y$ $y$ of Fig. 4. Fig. 2 shows, in end elevation, a fragment of a threaded collar, or ring, shown from the outside or at right angles to the view of it in Fig. 1. Fig. 3 shows a fragment of a collar as seen diametrically opposite to the view of Fig. 2. Fig. 4 shows the end of a threaded pipe and its ring with its opposite posts in plan view. Fig. 5 shows the valve or pipe-end cover in plan view as seen on its inner or under side.

Like reference letters denote like parts throughout.

The object of my invention is to produce a pipe-end covering or valve, and mechanism to hold it, in which said valve does not rotate, but on which its holding mechanism rotates, which shall be very efficient and in which the parts are very few and simple of construction, and easily understood and operated. To attain said desirable end I construct my said device in substantially the following manner, namely:—

The pipe-end $a$ is provided with a suitable thread $a'$ on which freely turns a threaded collar or ring $b$ provided with opposite studs $c$ and $d$ provided with pintles $e$ and $e'$ and on one of said pintles $e$ turns a bar $g$ to the center of which is secured, on a screw $h$, a valve $i$ provided with a channel inlaid with an elastic material $j$ which fits on the end of the pipe $a$. The opposite end of the bar $g$ fits into and is releasably locked by means of a reciprocatable, but non-removable, pintle $f$ integrally attached to a vertical element $f'$ which, in turn, is an integral element with an element $f^2$ which is parallel to and longer than said element $f$ and passes through the lower part of the stud $d$ and has its end $f^3$ turned up at a point which will hold the end of the pin $f$ in its hole at $e$ set so as to freely release the lug $k'$ of the bar $g$ held by the pin $f$ when pushed through the hole at $e'$. The central part of the valve $i$ is thick and extends close to the inner surface of the pipe $a$ and is held, at its axial center, by a screw $h$ which plays in an enlarged hole $h'$ but the screw holds fixedly in said valve, and on the bar $g$ is a boss or hub $h^2$ which allows for automatic adjustment of the valve on its seat which is on the end of the pipe $a$.

The bar or yoke $g$ has its end-lugs $k$ and $k'$ fitted to enter the slots in the studs $c$ and $d$ and on its top it has the thumb and finger lugs $l$ $l$ wherewith said yoke and its collar $b$ may be rotated in either direction, and thereby the threaded collar $b$ raised or lowered on the pipe $a$ and the valve $i$ pressed on its seat or raised therefrom, and thus the confined gas or air released in the most gradual manner, and when the pressure on the valve has ceased the pintle $f$ may be pushed back into the position shown in Fig. 3 when the yoke may be raised and with it the valve lifted so as to open the pipe quickly while all the parts related to this valve mechanism remain at or near their respective places and with which the closed condition of the valve may be made very quickly as none of the parts are subject to removal or loss by the operations. As the valve does not rotate on its seat there is no friction to destroy the fitting thereof.

To operate the device the cap $i$ is placed on the pipe-end and the pin $f$ passed through the parts $d$ and $k'$, the yoke $g$ is then rotated, by grasping the lugs $l$ $l$, so as to drive the threaded collar $b$ downward and thereby drive the pipe $a$ into the packing $j$. To open the pipe-end reverse the motion of the ring until the pin $f$ can be released and then placed into the position seen in Fig. 3 which will release the lug $k'$ after which the yoke may be turned on its pintle $e$.

What I claim is:—

An internally threaded collar, a bar held by it at each end, whereof one end is hinged fixedly and the other end is releasable, a threaded pipe-end, and an axially rotatable valve on said bar and pipe-end.

MARION W. PITNER.

Witnesses:
J. GIBBS,
J. J. ROOK.